US006601896B1

United States Patent
Nye et al.

(10) Patent No.: US 6,601,896 B1
(45) Date of Patent: Aug. 5, 2003

(54) BEDROOM SLIDE OUT ACTUATOR WITH ADJUSTABLE HEIGHT

(75) Inventors: Timothy L. Nye, Elkhart, IN (US); Robert H. Schneider, Beaver Dam, WI (US)

(73) Assignee: Actuant Corporation, Milwaukee, WI (US)

(*) Notice: Subject to any disclaimer, the term of this patent is extended or adjusted under 35 U.S.C. 154(b) by 0 days.

(21) Appl. No.: 09/564,663

(22) Filed: May 3, 2000

Related U.S. Application Data

(63) Continuation-in-part of application No. 08/823,170, filed on Mar. 25, 1997, now Pat. No. 6,116,671, which is a continuation-in-part of application No. 08/563,043, filed on Nov. 27, 1995, now Pat. No. 5,758,918.
(60) Provisional application No. 60/132,397, filed on May 4, 1999.

(51) Int. Cl.[7] .............................................. B62D 33/08
(52) U.S. Cl. ........................... 296/26.13; 296/26.01; 296/26.02; 296/26.03; 296/26.04; 296/26.05; 296/26.08; 296/26.09; 296/26.12; 296/165; 296/171; 296/172; 296/175
(58) Field of Search .......................... 296/26.01, 26.02, 296/26.03, 26.04, 26.05, 26.08, 26.09, 26.12, 26.13, 165, 171, 172, 175, 35.3, 167

(56) References Cited

U.S. PATENT DOCUMENTS

| | | | |
|---|---|---|---|
| 1,471,549 A | 10/1923 | Clement | |
| 2,147,892 A | 2/1939 | Gray | 20/2 |
| 2,842,972 A * | 7/1958 | Houdart | 296/26 |
| 3,137,041 A | 6/1964 | Mullen | 20/2 |
| 3,181,910 A | 5/1965 | Thomas | 296/23 |
| 3,482,716 A | 12/1969 | Leadley | 214/75 |
| 3,672,238 A | 6/1972 | Young et al. | 74/89.2 |
| 3,884,520 A | 5/1975 | Peterson | 296/27 |
| 4,133,571 A | 1/1979 | Fillios | 296/23 |
| 4,139,229 A | 2/1979 | Cooper | 296/23 |
| 4,192,544 A | 3/1980 | Patterson | 296/165 |
| 4,197,600 A | 4/1980 | Slabic | 5/118 |
| 4,270,791 A | 6/1981 | Tann | 296/171 |
| 4,358,133 A | 11/1982 | Stucky | 280/656 |
| 4,362,329 A | 12/1982 | Laube et al. | 296/26 |
| 4,500,132 A | 2/1985 | Yoder | 296/171 |
| 4,557,518 A | 12/1985 | Maclean et al. | 296/156 |
| 4,657,300 A | 4/1987 | Penny et al. | 296/173 |
| 4,861,049 A | 8/1989 | Losi | 280/47.16 |
| 4,874,197 A | 10/1989 | Grable | 296/162 |
| 4,930,837 A | 6/1990 | Marsh et al. | 296/165 |
| 4,955,661 A | 9/1990 | Mattice | 296/171 |
| 4,960,299 A | 10/1990 | Steadman | 296/26 |
| 5,090,749 A | 2/1992 | Lee | 296/171 |
| 5,125,202 A | 6/1992 | Kissinger | 52/239 |
| 5,154,469 A | 10/1992 | Morrow | 296/26 |
| 5,170,901 A | 12/1992 | Bersani | 220/1.5 |
| 5,193,878 A | 3/1993 | Weaver | 296/162 |
| 5,333,420 A | 8/1994 | Eden | 52/67 |
| 5,522,685 A * | 6/1996 | Lessard | 296/26 |
| 5,544,998 A * | 8/1996 | Malinowski | 296/26.09 |
| 5,791,715 A * | 8/1998 | Nebel | 296/26 |
| 5,938,092 A * | 8/1999 | Johnson | 296/26.08 X |
| 6,065,792 A * | 5/2000 | Sciullo et al. | 296/26.09 |
| 6,120,235 A * | 9/2000 | Humphries et al. | 296/26.12 X |
| 6,196,604 B1 * | 3/2001 | Hoh et al. | 296/26.05 |

* cited by examiner

*Primary Examiner*—D. Glenn Dayoan
*Assistant Examiner*—Lori L. Coletta
(74) *Attorney, Agent, or Firm*—Quarles & Brady LLP

(57) ABSTRACT

An operating mechanism for use in a vehicle having a bedroom slide out, the bedroom slide out having a platform which is movable laterally relative to a vehicle having a stationary floor. The operating mechanism laterally moves the movable room section relative to the stationary room section between a retracted position and an extended position, and has a height adjustable frame. The frame includes overlapping side members which are slidably moveable relative to each other and fastenable at two or more discrete heights.

25 Claims, 4 Drawing Sheets

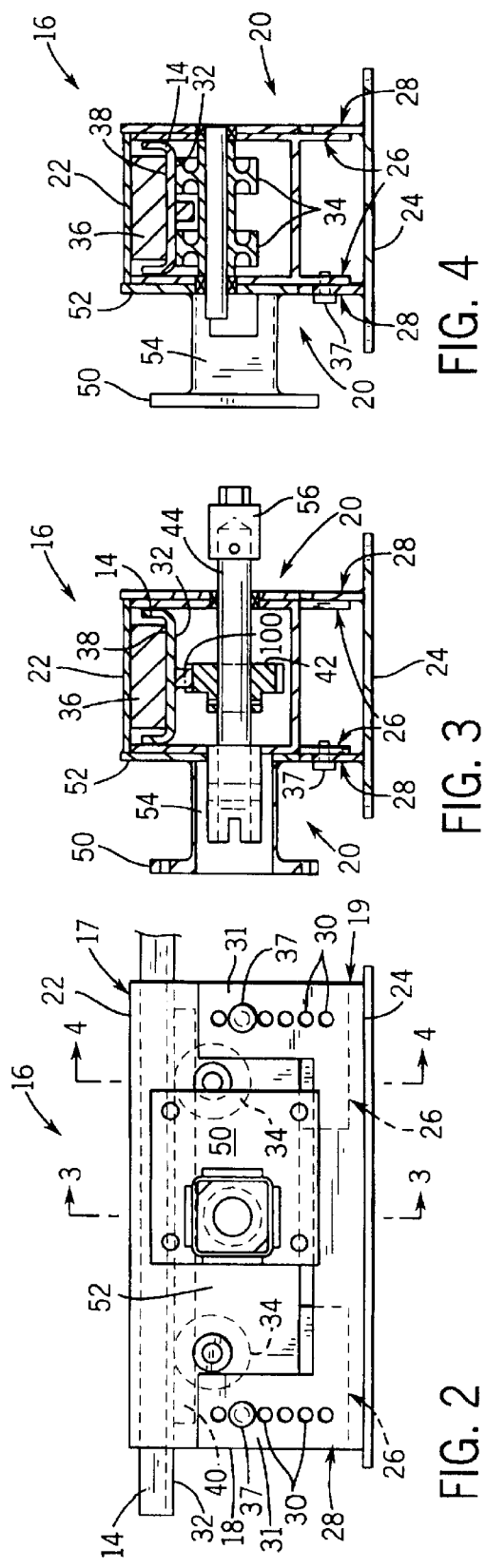
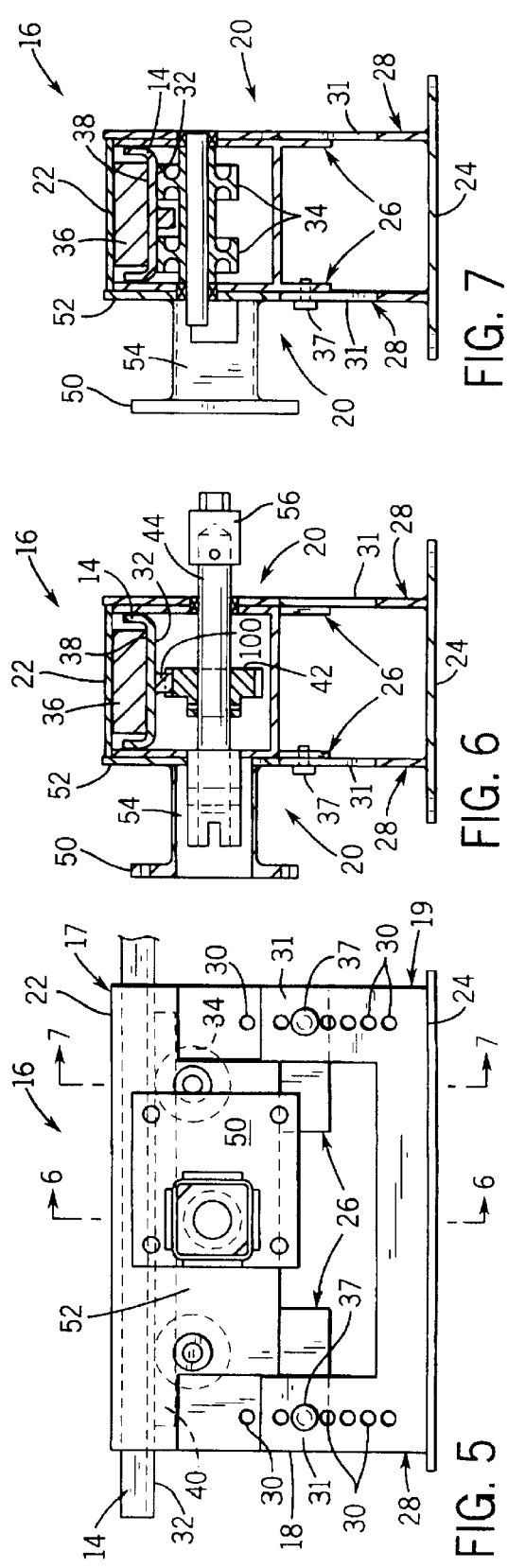

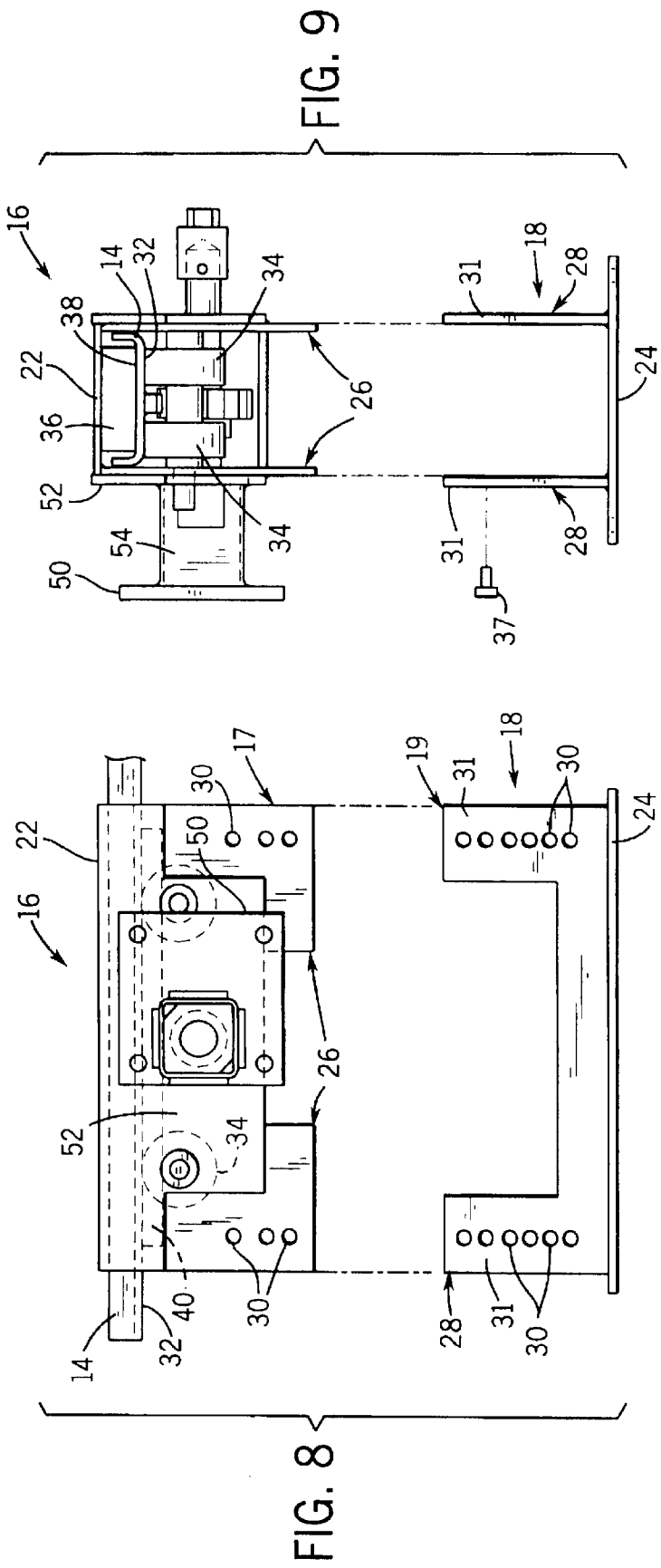

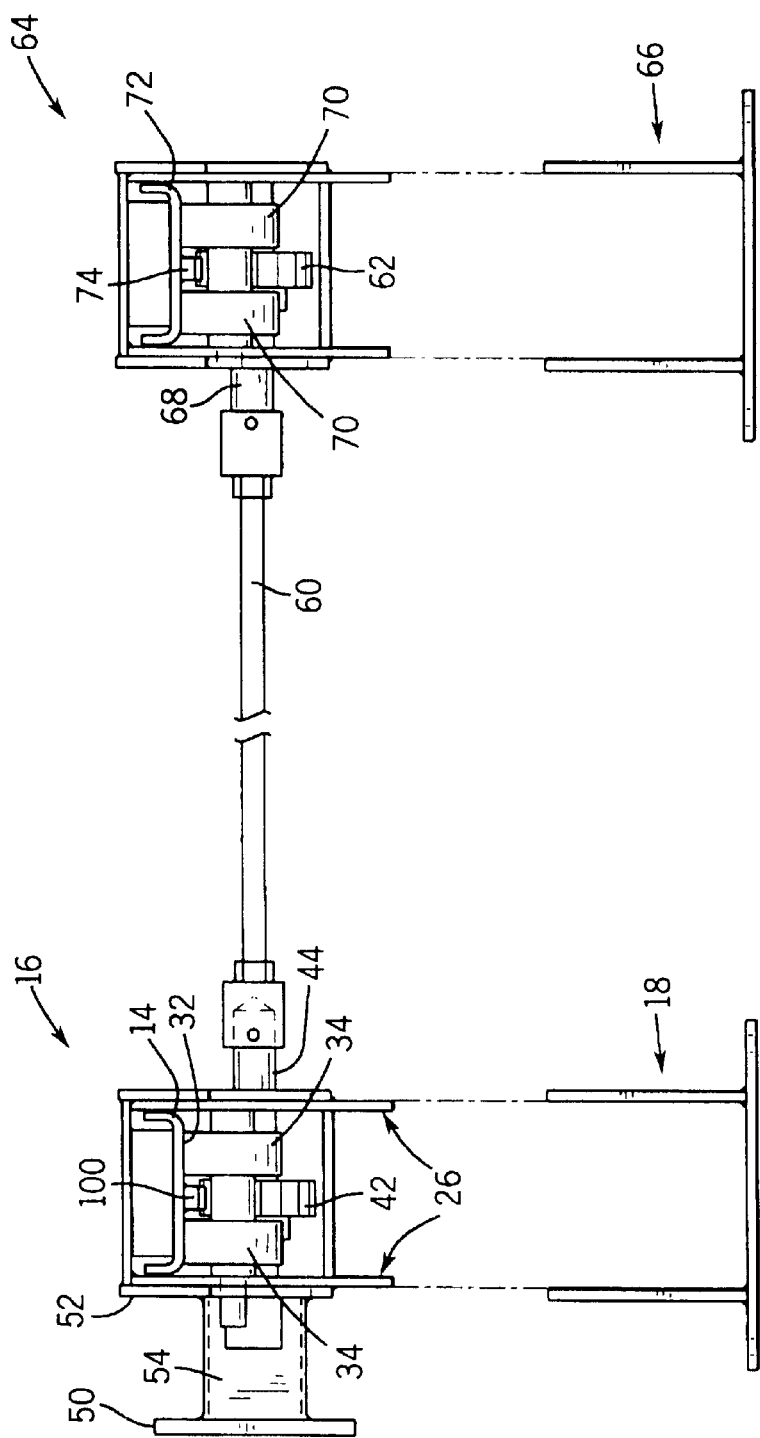

BEDROOM SLIDE OUT ACTUATOR WITH ADJUSTABLE HEIGHT

CROSS REFERENCES TO RELATED APPLICATIONS

This application claims the benefit of U.S. Provisional Patent Application No. 60/132,397 filed on May 4, 1999 and a continuation in part of U.S. Application No. 08/823,170 filed on Mar. 25, 1997, now U.S. Pat. No. 6,116,671, which is a continuation in part of U.S. Application No. 08/563,043 filed on Nov. 27, 1995, now U.S. Pat. No. 5,758,918.

STATEMENT REGARDING FEDERALLY SPONSORED RESEARCH

Not Applicable

BACKGROUND OF THE INVENTION

This invention relates to vehicles having expandable room sections, and more particularly to an improved actuator for moving a bedroom slide out between an extended and retracted position relative to the vehicle.

In order to increase the available interior space of recreational vehicles or trailers, it is known to provide a bedroom slide-out as part of the structure of the vehicle or trailer. A bedroom slide out is a raised platform, which can be used as a sleeping platform and is enclosed on all but one side. During transit, the slide-out section is retracted and stored in the interior of the vehicle or trailer, with the exterior wall of the slide-out room section approximately flush with the exterior of the vehicle or trailer. To use the slide-out section, the vehicle is first parked and leveled. The slide-out room section is then slid outward from the vehicle to an extended position, increasing the interior space of the vehicle.

In prior art constructions, the mechanism for moving the slide-out section relative to the stationary room section is fixed to the vehicle body, and pushes the bedroom slide-out away from the vehicle when extending the slide-out room, and pulls the slide-out section towards the vehicle when retracting the room. In addition, the mechanism is designed for a particular application having specific dimensional requirements which define particular aspects of the mechanism, such as the mechanism height. A vehicle which does not conform to the original mechanism application requirements, must be modified, or a different mechanism must be used.

SUMMARY OF THE INVENTION

The present invention provides a vehicle including a bedroom slide out having a platform which is movable laterally relative to a vehicle having a stationary floor. An operating mechanism laterally moves the platform relative to the stationary room section between a retracted position and an extended position.

The operating mechanism has a height adjustable frame with overlapping side members which are slidably moveable relative to each other and fastenable at two or more discrete heights. The frame includes opposing sides which slidably support the movable platform. Each side includes a first plate fixed to the vehicle which extends toward the platform. A second plate overlaps said first plate, and is slidably movable relative to said first plate. At least one hole is formed in one of the plates, and a plurality of linearly aligned holes is formed in the other of the plates, the hole formed in the one plate is alignable with two or more of the holes formed in the other plate, wherein alignment of the one hole in the one of the plates with one of the two or more of the holes formed in the other plate defines a first side height, and alignment of the one hole in the one of the plates with another one of the two or more of the holes formed in the other plate defines a second side height. A fastener inserted into the aligned holes fixes the height of the frame side.

A general objective of the present invention is to provide an operating mechanism which is not limited to specific dimensions of a particular application. This objective is accomplished by providing an operating mechanism having a height adjustable frame.

The foregoing and other objects and advantages of the invention will appear from the following description. In the description, reference is made to the accompanying drawings which form a part hereof, and in which there is shown by way of illustration a preferred embodiment of the invention.

BRIEF DESCRIPTION OF THE DRAWINGS

FIG. 2 is a side view of the slide out actuator of FIG. 1 in a lower position;

FIG. 3 is a cross sectional view of the slide out actuator along line 3—3 of FIG. 2;

FIG. 4 is a cross sectional view of the slide out actuator along line 4—4 of FIG. 2;

FIG. 5 is a side view of the slide out actuator of FIG. 1 in an upper position;

FIG. 6 is a cross sectional view of the slide out actuator along line 6—6 of FIG. 5;

FIG. 7 is a cross sectional view of the slide out actuator along line 7—7 of FIG. 5;

FIG. 8 is an exploded side view of the operating mechanism of FIG. 1; and

FIG. 9 is an exploded end view of the operating mechanism of FIG. 1; and

FIG. 10 is an exploded side view of an operating mechanism with an actuation mechanism coupled to a synchronization mechanism.

DETAILED DESCRIPTION OF THE INVENTION

Figure 1:
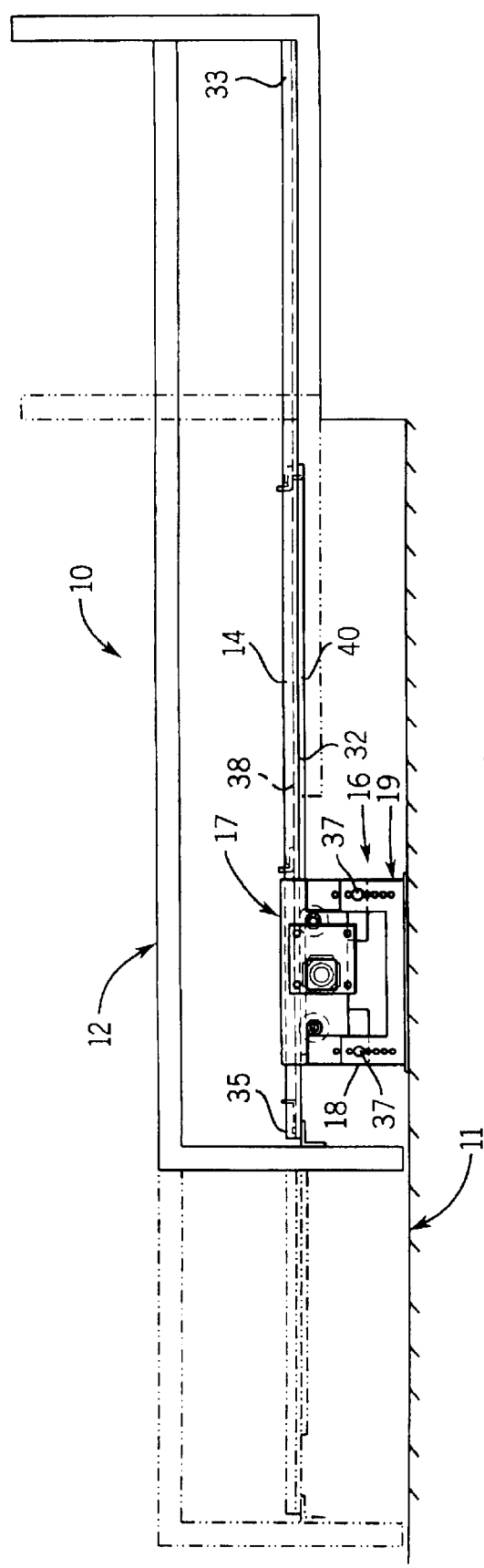
FIG. 1 is a side view of a vehicle stationary floor having a slide-out section incorporating the present invention mounted thereon.

The present invention provides an expandable bedroom slide out attached to a known trailer or recreational vehicle which provides distinct advantages over the prior art as will be described and appreciated hereafter. In the preferred embodiment, the trailer or recreational vehicle (generally referred to as the vehicle) is equipped with a slide-out section used to provide additional interior room space. However, it should be understood that the invention can also apply to expandable sections or compartments provided on other vehicles for use in construction, military, medical, education, mobile broadcast and other applications, to expand the inside volume of the vehicle.

Referring now to FIG. 1, a bedroom slide out 10 is mounted to a vehicle stationary floor 11. The bedroom slide out 10 has a movable platform 12, such as suitable for use as a bed base, mounted to each end of a U-shaped channel 14. The U-shaped channel 14 is slidably mounted in an actuator 16 which forcibly moves the platform 12 between extended and retracted positions. The actuator 16 is rigidly mounted to the vehicle stationary floor 11, and extends and retracts the movable platform by forcibly sliding the U-shaped channel 14 with a rack and pinion drive. The moveable platform 12 is disposed above the actuator frame 18, and is mounted to both ends of the U-shaped channel 14.

The channel 14 is slidably disposed in the actuator frame 18 which simultaneously pushes and pulls the platform 12 to provide a smooth transition between the extened and retractedd positions. The U-shape channel 14 has a top surface 38, bottom surface 32, and the two ends 33, 35. A rack 40 mountes to the U-channel bottom surface 32 emgages a pinion 42 rotatably mounted in the actuator 16 to urge the channel 14 in the desired direction.

As shown in FIG. 1, the slide out actuator 16 has a frame 18 mounted to the vehicle floor 11. Looking particularly at FIGS. 3, 4, 6, and 7, the actuator frame 18 includes opposing sides 20 joined by a top plate 22 and a bottom plate 24. Each side 20 is formed from a pair of vertical slidably movable overlapping inner and outer plates 26, 28. The top plate 22 is fastened to the inner side plates 26 by methods known in the art, such as welding to form a frame upper assembly 17 which supports frame operating components, such as rollers 34, the pinion 42, a motor mount 50, a shaft 44, and the like. The bottom plate 24 is similarly mounted to the outer side plates 28 to form a frame lower assembly 19, and is mounted to the vehicle to secure the actuator 16 to the vehicle floor 11.

The inner side plate 26 is substantially rectangular, and can be cutout to reduce the plate material required. The outer side plate 28 is substantially rectangular, and has upstanding legs 31. The outer plate 28 is open between the legs 31 to provide room for the a shaft 44 and mount 50. Holes 30 are formed in the upstanding legs 31, and are in substantially the same plane as holes 30 formed in the inner plate 26 to allow alignment between a hole 30 in each plate 26, 28.

The height of the frame 18 is adjusted by slidably moving the overlapping plates 26, 28 to obtain the desired height. Bach frame side 20 has a lower position, shown in FIGS. 2–4 and 8, and an upper position, with intermediate positions in between. The lower position is accomplished by aligning the lowest hole in the outer overlapping plate 28 on each side of the frame 18 with the lowest hole in the corresponding inner overlapping plate 26, and then pinning the plates 26, 28 together using a pin, such as a bolt 37. The upper position is accomplished by aligning the highest hole in the lower overlapping plate 28 on each side of the frame 18 with the lowest hole in the upper overlapping plate 26, and then pinning the plates 26, 28 together. Intermediate positions, such as the position shown in FIGS. 5–7 and 9, are accomplished by aligning various combinations of the holes 30, and fastening the plates 26, 28 together.

The height of the actuator 16 is fixed by aligning at least one of the holes 30 in the inner plate 26 with a hole 30 in the outer plate 28, and then fastening the plates 26, 28 together. Preferably, bolts or pins are secured in at least one pair of aligned holes 30 to fix the height of the actuator 16. Advantageously, the height adjustable frame 18 provides an easily adaptable actuator 16 for a plurality of applications.

The frame upper assembly supports the channel 14 and the pinion 42 for urging the channel 14 between the extended and retracted positions. In the preferred embodiment, the frame upper assembly includes two pairs of rollers 34 rotatably mounted to the plates 26 on opposing sides of the pinion 42. The rollers 34 engage the U-channel bottom on opposing sides of the rack 40 to support the channel as it slides through the frame. Each pair of rollers 34 are rotatably mounted to the inner plates 26 of the upper frame assembly on opposing sides of the pinion 42.

The pinion 42 is mounted to a rotatable shaft 44, jounalled to the plates 26, and driven by an electric motor (not shown). The electric motor is mounted to mount 50, which is welded to plate 52. Plate 52 is bolted to plate 26, and shaft 44 extends through plate 26 and terminates in an end 54 which is engageable by the drive means. The opposite end of the shaft 44 may extend through the plate 26 on the opposite side of the frame 18, and have end 56 to be engaged, for example, by a shaft 60 that connects to the pinion 62 of a second slide out actuator 64, acting as a synchronization mechanism, having a frame 66, shaft 68, rollers 70, channel 72 and rack 74, spaced laterally from the unit 16 as illustrated in FIG. 10, so as to synchronize the two units 16 and 64. Although an electric motor is disclosed, the shaft may be driven by other methods known in the art, such as manually.

A low friction block 36, such as UHMW, is mounted to the frame top 22, and engages the U-channel top 38 to keep the pinion 42 engaged with the rack 40. Advantageously, the block prevents the U-channel 14 from pivoting on one of the roller pairs 34 when the channel is substantially fully extended or retracted. Although a block is disclosed, other methods for maintaining the engagement of the rack with the pinion can be used, such as by using rollers, without departing from the scope of the present invention.

While there has been shown and described what are at present considered the preferred embodiment of the invention, it will be obvious to those skilled in the art that various changes and modifications can be made therein without departing from the scope of the invention defined by the appended claims. Therefore, various alternatives and embodiments are contemplated as being within the scope of the following claims particularly pointing out and distinctly claiming the subject matter regarded as the invention.

We claim:

1. An operating mechanism for laterally moving a platform relative to a stationary floor fixed to vehicle between a retracted position and extended position, said mechanism comprising;

a frame having opposing sides which can support a movable platform, each side including:

a first plate fixable to the vehicle, a second plate overlapping said first plate, and slidably movable relative to said first plate, at least one hole formed in one of said plates, a plurality of linearly aligned holes formed in an other of said plates, wherein said one hole formed in said one of said plates is alignable with two or more of said holes formed in said other of said plates, wherein alignment of said one hole in said one of said plates with one of said two or more of said holes formed in said other plate defines a first side height, and alignment of said one hole in said one of said plate with another one of said two or more of said holes formed in said other plate defines a second side height, a fastener inserted into aligned holes of said first and second plates to fix the height of said frame side; and a drive assembly fixed relative to said second plate, and engageable with the movable platform for moving the platform between the retracted position and the extended position.

2. The operating mechanism of claim 1, including a channel fixable to the platform and engaging said drive assembly, said channel being mounted between said second plate of each side of said frame for slidable movement therebetween.

3. The operating mechanism of claim 2, in which said drive assembly includes a pinion rotatably mounted between said second plate of each side of said frame, said pinion engaging a rack extending from said channel.

4. The operating mechanism of claim 2, including two pairs of rollers rotatably mounted between said second plates of each side of said frame, said rollers engaging a bottom surface of said channel.

5. The operating mechanism of claim 2, including a bottom plate joined to said first plate of each side of said frame, and a top plate joined to said second plate of each side of said frame.

6. The operating mechanism of claim 5, including a low friction block mounted to said frame for engaging a top surface of said channel.

7. The operating mechanism of claim 1, in which said fastener is a pin.

8. The operating mechanism of claim 7, in which said pin is a bolt.

9. The operating mechanism of claim 1, in which said one of said plates includes a plurality of linearly aligned holes coplanar with said plurality of linearly aligned holes formed another of said plates.

10. An operating mechanism for laterally moving a platform relative to a stationary floor fixed to a vehicle between a retracted position and an extended position, said mechanism comprising:
   a first frame assembly fixable relative to the stationary floor fixed to the vehicle, and including a first plate;
   a second frame assembly slidably movable relative to said first frame assembly, and including a second plate slidably moveable and overlapping said first plate, wherein one of said plates includes a plurality of linearly aligned holes coplanar with a plurality of linearly aligned holes formed in another of said plates.
   a channel slidably supported by said second frame assembly for movement between the retracted position and the extended position, and fixable to the platform, said channel being spaced a distance from said first frame assembly, wherein slidable movement of said second frame assembly relative to said first frame assembly modifies the distance between said channel and said first frame assembly; and
   a drive assembly fixed relative to said second frame assembly and engaging said channel, wherein said drive assembly urges said channel between the retracted position and the extended position.

11. An operating mechanism for laterally moving a platform relative to a stationary floor fixed to a vehicle between a retracted position and an extended position, said mechanism comprising:
   a first frame assembly fixable relative to the stationary floor fixed to the vehicle, and including a first plate;
   a second frame assembly slidably movable relative to said first frame assembly, and including a second plate slidably moveable and overlapping said first plate;
   at least one hole formed in one of said plates;
   a plurality of linearly aligned holes formed in the other of said plates, wherein said one hole formed in said one plate is alignable with two or more of said holes formed in said other plate, wherein alignment of said one hole in said one of said plates with one of said two or more of said holes formed in said other plate defines a first side height, and alignment of said one hole in said one of said plates with another one of said two or more of said holes formed in said other plate defines a second side height; and
   a fastener inserted into aligned holes of said first and second plates to fix the height of said frame side a channel slidably supported by said second frame assembly for movement between the retracted position and the extended position, and fixable to the platform, said channel being spaced a distance from said first frame assembly, wherein slidable movement of said second frame assembly relative to said first frame assembly modifies the distance between said channel and said first frame assembly; and
   a drive assembly fixed relative to said second frame assembly and engaging said channel, wherein said drive assembly urges said channel between the retracted position and the extended position.

12. The operating mechanism of claim 11, in which said fastener is a pin.

13. The operating mechanism of claim 12, in which said pin is a bolt.

14. An operating mechanism for laterally moving a platform relative to a stationary floor fixed to a vehicle between a retracted position and an extended position, said mechanism comprising:
   a first frame assembly fixable relative to the stationary floor fixed to the vehicle;
   a second frame assembly slidably movable relative to said first frame assembly;
   a channel slidably supported by said second frame assembly for movement between the retracted position and the extended position, and fixable to the platform, said channel being spaced a distance from said first frame assembly, wherein slidable movement of said second frame assembly relative to said first frame assembly modifies the distance between said channel and said first frame assembly;
   a drive assembly fixed relative to said second frame assembly and engaging said channel, wherein said drive assembly urges said channel between the retracted position and the extended position; and said drive assembly includes a pinion rotatably mounted to said second frame assembly, and engaging a rack mounted to said channel.

15. The operating mechanism of claim 10, including rollers rotatably mounted to said second frame assembly and supporting said channel.

16. An operating mechanism for laterally moving a platform relative to a stationary floor fixed to a vehicle between a retracted position and an extended position, said mechanism comprising:
   a first frame assembly fixable relative to the stationary floor fixed to the vehicle;
   a second frame assembly slidably movable relative to said first frame assembly;
   a channel slidably supported by said second frame assembly for movement between the retracted position and the extended position, and fixable to the platform, said channel being spaced a distance from said first frame assembly, wherein slidable movement of said second frame assembly relative to said first frame assembly modifies the distance between said channel and said first frame assembly;
   a drive assembly fixed relative to said second frame assembly and engaging said channel, wherein said drive assembly urges said channel between the retracted position and the extended position; and
   a low friction block mounted to said second frame assembly for engaging said channel.

17. A vehicle having an extendible bedroom slide out comprising a stationary floor, a movable floor slidably movable relative to said stationary floor between a retracted position and an attended position;

a frame mounted to said stations floor, and having opposing sides supporting said movable floor, each side including:

a first plate fixed to said stationary floor, and extending toward said platform, a second plate overlapping said first plate, and slidably movable relative to said first plate, at least one hole formed in one of said plates, and a plurality of linearly aligned holes formed in the other of said plates, wherein said one hole formed in said one plate is alignable with two or more of said holes formed in said other plate, wherein alignment of said one hole in sad one of said plates with one of said two or more of said holes formed in said other plate defines a fist side height, and alignment of said one hole in said one of said plates with another one of said two or more of said holes formed in said other plate defines a second side height;

a fastener inserted into aligned holes of said first and second plates to fix the height of said Same side; and a drive assembly fixed relative to said frame and engaging said movable floor, wherein said drive assembly slidably moves said movable floor between the retracted position and the extended position.

18. The operating mechanism of claim 11, including rollers rotatably mounted to said second frame assembly and supporting said channel.

19. The operating mechanism of claim 14, including rollers rotatably mounted to said second frame assembly and supporting said channel.

20. The operating mechanism of claim 16, including rollers rotatably mounted to said second frame assembly and supporting said channel.

21. An operating mechanism for laterally moving a platform relative to a stationary floor fixed to a vehicle between a retracted position and an extended position, said mechanism comprising:

an actuation mechanism including a first pinion and a first pair of rollers rotatably mounted between spaced sides of a first frame in which slides a first channel mounted to the platform and having a first rack engaged by the first pinion for moving the platform between the retracted position and the extended position;

a synchronization mechanism having a second pinion and a second pair of rollers rotatably mounted between spaced sides of a second frame in which slides a second channel mounted to the platform spaced from the first channel and having a second rack engaged by the second pinion; and a shaft joining the first pinion to the second pinion so that the displacement of the first and second channels is synchronized.

22. The mechanism of claim 21, further including a drive mounted to the first frame for rotating the shaft.

23. The mechanism of claim 21, wherein the first and second pairs of rollers are disposed on opposite sides of the respective first and second pinions.

24. The mechanism of claim 23, wherein the first and second racks are disposed on bottom surfaces of respective first and second channels.

25. The mechanism of claim 24, wherein the first and second pairs of rollers engage a bottom surface of the respective first and second channels.

* * * * *

UNITED STATES PATENT AND TRADEMARK OFFICE
CERTIFICATE OF CORRECTION

PATENT NO.     : 6,601,896 B1
DATED          : August 5, 2003
INVENTOR(S)    : Timothy L. Nye et al.

It is certified that error appears in the above-identified patent and that said Letters Patent is hereby corrected as shown below:

Column 3,
Line 7, "extened" should be -- extended --.
Line 8, "edd" should be -- ed --.
Line 8, "U-shape" should be -- U-shaped --.
Line 10, "mountes" should be -- mounted --.
Line 10, "emgages" should be -- engages --.
Line 37, "Bach" should be -- Each --.

Column 4,
Line 35, "to vehicle" should be -- to a vehicle --.
Line 36, "and extended" should be -- and an extended --.
Line 52, "plate with" should be -- plates with --.

Column 5,
Lines 20-21, "formed another" should be -- formed in another --.

Column 7,
Line 3, "attended" should be -- extended --.
Line 5, "stations" should be -- stationary --.
Line 12, "plate$_7$" should be -- plates, --.
Line 17, "sad" should be -- said --.
Line 18, "fist" should be -- first --.
Line 24, "Same" should be -- frame --.

Signed and Sealed this

Third Day of February, 2004

JON W. DUDAS
*Acting Director of the United States Patent and Trademark Office*